United States Patent Office 2,773,991
Patented Dec. 11, 1956

2,773,991
METHOD OF GEOCHEMICAL PROSPECTING

Ellis E. Bray, Cedar Hill, Tex., assignor, by mesne assignments, to Socony Mobil Oil Company, Inc., a corporation of New York No Drawing. Application August 28, 1952,
Serial No. 306,956

17 Claims. (Cl. 250—83.6)

This invention relates to geochemical prospecting and relates more particularly to geochemical prospecting for subterranean petroleum reservoirs.

In the locating of subterranean petroleum reservoirs, use has been made of geochemical methods. These methods are based on the theory that hydrocarbons migrate upwardly from the subterranean petroleum reservoir and become part of the organic matter present in the surface or near surface zones of the earth or in the earth strata intermediate to the surface or near surface zones of the earth. In accordance with this theory, anomalies in the concentrations of organic matter in the earth, i. e., concentrations of organic matter in the earth at particular locations higher than the concentrations at adjacent or neighboring locations, due to the additional amount of organic matter in the earth contributed by the hydrocarbons migrating from the subterranean petroleum reservoir are regarded as being indicative of the presence of the subterranean petroleum reservoir. Thus, as a prospecting method, samples of earth have been collected and analyzed for selected portions or all of the organic matter therein and anomalies in the amounts of the selected portions or all of the organic matter have been correlated with the locations from which the samples were taken to obtain information as to the location of the subterranean petroleum reservoir. It has been recognized that hydrocarbons or organic derivatives thereof may be present in the earth as the result of vegetative decomposition or bacterial action or for other reasons not related to the presence of a subterranean petroleum reservoir. Therefore, in geochemical prospecting methods, anomalies in the amounts of selected portions or all of the organic matter in the earth samples from the prospect area cannot be regarded as being a positive indication of the presence of a subterranean petroleum reservoir.

It is an object of this invention to provide a geochemical prospecting method for subterranean petroleum reservoirs. It is another object of this invention to provide a means for estimating whether selected portions or all of the organic matter present in an earth sample contain components of petroleum origin. It is another object of this invention to improve the dependability of geochemical prospecting methods which are based upon the detection in earth samples from a prospect area of anomalies in the amounts of a selected portion or all of the organic matter contained therein. These and other objects of the invention will become apparent from the following description thereof.

In accordance with the invention, earth samples are collected from a prospect area, each of the earth samples is analyzed for the quantity therein of at least a selected portion of the organic matter, and at least a representative sample of the organic matter contained in the earth samples having anomalous amounts of organic matter and at least a representative sample of the organic matter contained in the earth samples not having anomalous amounts of organic matter are analyzed for the proportion of carbon therein having an atomic weight of 14 to carbon having an atomic weight of 12.

Ordinary carbon has an atomic weight of 12 and the nucleus of an atom of ordinary carbon contains six protons and six neutrons, each proton and each neutron having a mass of one. However, carbon exists in the form of various isotopes, each of which has an atomic number of six, i. e., the nucleus of each contains six protons. One of these isotopes has an atomic weight of 14, the nucleus containing six protons and eight neutrons. Carbon having an atomic weight of 14 is formed naturally from atmospheric nitrogen which has an atomic weight of 14, the nucleus containing seven protons and seven neutrons, as a result of reaction of the nitrogen with secondary neutrons produced by cosmic radiation whereby a neutron is added to the nucleus and a proton is removed from the nucleus with the result that the nucleus contains six protons and eight neutrons.

The carbon having an atomic weight of 14 thus produced eventually appears in the form of carbon dioxide in the atmosphere, and this carbon dioxide wherein the carbon has an atomic weight of 14 is utilized, along with carbon dioxide wherein the carbon has an atomic weight of 12, by plant life in the formation of their body structure by the photosynthesis reaction. The proportion in the atmosphere of carbon dioxide wherein the carbon has an atomic weight of 14 to carbon dioxide wherein the carbon has an atomic weight of 12 is fairly constant since an equilibrium exists between formation and disintegration of carbon having an atomic weight of 14. Thus the ratio of carbon having an atomic weight of 14 to carbon having an atomic weight of 12 in the body structure of newly formed plant life is also fairly constant. However, as is known, carbon having an atomic weight of 14 is unstable, radioactively decomposing by emission of a beta particle to form nitrogen, and has a half life of about 5,568 years. Thus, as the body structure of dead plant life containing the carbon therein, and any compounds formed from the body structure of the plant life, ages, the proportion of carbon having an atomic weight of 14 to carbon having an atomic weight of 12 decreases. Accordingly, the age of the carbon in any naturally occurring organic compound of sufficiently recent origin to contain carbon having an atomic weight of 14 may be estimated by determining the proportion of the amount of carbon having an atomic weight of 14 to the amount of carbon having an atomic weight of 12, and the proportion may be approximated for all practical purposes by determining the extent of radioactivity per unit amount of the organic carbon.

Since the half life of carbon having an atomic weight of 14 is about 5,568 years, the amount of carbon having an atomic weight of 14 in any matter having its ultimate origin in plant life will in, say, 35,000 years, decrease to approximately one-eightieth of its original value and amounts of this order will begin to approach undetectability. Accordingly, since petroleum is considered to have a plant and animal origin and an age of hundreds of thousands of years, the amount of carbon therein having an atomic weight of 14 will, for all practical purposes, be zero. On the other hand, since the time elapsing between the utilization of the carbon dioxide by plant life in the formation of their body structure by the photosynthesis reaction and the complete conversion of the carbon in the body structure of the plant life to carbon dioxide by bacterial decomposition and otherwise is variously estimated to be of the order of five hundred to a thousand years, the organic matter in the earth's crust derived directly from vegetative matter will contain measurable amounts of carbon having an atomic weight of 14. Thus, where at least a portion of the organic matter in an earth sample has an origin in a subterranean petroleum reservoir, the proportion in the organic matter of the amount of carbon having an atomic weight of 14 to the amount of carbon having an atomic weight of 12 will be less than where a lesser amount or none of the organic matter has an origin in a subterranean petroleum reservoir. Therefore, by analyzing at least representative samples of the organic matter for the amount of carbon having an atomic weight of 14, it can be determined whether those earth samples containing anomalous amounts of a selected portion or all of the organic matter also contain a lesser proportion of carbon having an atomic weight of 14 to carbon having an atomic weight of 12 than those earth samples not containing anomalous amounts of the same selected portion or all of the organic matter. Where earth samples contain an anomalous amount of a selected portion or all of the organic matter, i. e., a larger amount of a selected portion or all of the organic matter than the background amounts, and also contain an anomalous proportion of carbon having an atomic weight of 14 to carbon having an atomic weight of 12, i. e., a lesser proportion of carbon having an atomic weight of 14 to carbon having an atomic weight of 12 than the background proportion, they contain organic matter derived from a subterranean petroleum reservoir and the presence of a subterranean petroleum reservoir is indicated. On the other hand, where earth samples contain an anomalous amount of a selected portion or all of the organic matter but do not contain a lesser proportion of carbon having an atomic weight of 14 to carbon having an atomic weight of 12 than the background proportion, they do not contain organic matter derived from a subterranean petroleum reservoir, and the presence of a subterranean petroleum reservoir is not indicated.

In the practice of the invention, earth samples are collected from the prospect area and the samples are preferably collected from points set out in the area according to a definite plan or pattern. For example, the sampling points may be spaced at regular intervals, say about one-fifth of a mile along a traverse, or along a series of traverses, or along a grid pattern. However, any suitable interval spacing may be employed. Preferably, the earth samples are taken from points below the surface of the earth in order to avoid samples which have been affected by weathering, contamination, or other factors rendering them not representative of the prospect area. Samples taken at a depth of about one foot will ordinarily be satisfactory although local conditions may require that the sampling be made at greater depths. Generally, sampling may be carried out in accordance with any of the patterns and any of the procedures heretofore employed in the geochemical prospecting art.

After collection, the earth samples are dried and crushed and a weighed portion of each analyzed for the quantity of a selected portion or all of the organic matter. One method for analyzing for the total quantity or all of the organic matter in the earth samples, involves converting the organic carbon to carbon dioxide by well known oxidation techniques, and thereafter quantitatively measuring the amount of carbon dioxide, as by converting to barium carbonate and weighing. The amount of carbon dioxide thus determined is a measure of the total quantity of organic matter in the earth sample since the ratio of carbon to other elements forming the organic matter in an earth sample may be regarded as being a constant for all practical purposes. The samples, however, are preferably analyzed for the quantity of a selected portion of the organic matter therein, such as, for example, the quantity of extractable organic matter therein. If desired, the extractable organic matter may be separated into portions and analysis made for the quantity of at least one of these portions.

For analyzing for the quantity of extractable organic matter in the earth samples, a weighed portion of each earth sample, after drying and crushing, is extracted with a suitable solvent. Any solvent capable of desorbing and dissolving extractable organic matter from the earth samples may be employed. Suitable solvents include carbon tetrachloride, chloroform, carbon disulfide, acetone, methanol, ethanol, propanol, diethyl ether, benzene, etc. Mixtures of solvents may also be employed such as an equimolar mixture of an alcohol and carbon tetrachloride or a mixture comprising about ten volumes of benzene and one volume of methanol. The extraction of the soil samples may be carried out in any known manner as, for example, by employing a Soxhlet extractor or a ball mill extractor.

Following extraction of the earth samples, each of the solutions of extract is separated as by decanting, if separation thereby can be effected, or by filtering if necessary, and the solutions are analyzed for the quantity therein of organic matter extracted from each earth sample. Analysis may be effected by separating the solvent from the extract and weighing the extract. Separation of the solvent from the extract can be satisfactorily accomplished by weathering the solution of extract, i. e., by heating the solution of extract to a temperature sufficiently high to vaporize the solvent, and blowing a stream of air or other suitable gas thereover during the heating period. A suitable temperature for weathering is 40° C. and weathering is continued at the temperature employed until the extract comes to constant weight. An advantage of weathering is that the extract obtained from each earth sample is uniform with respect to the removal therefrom of any volatile constituent extracted from the earth samples. The extract, after removal of the solvent, is in the form of a waxy semi-solid.

Analysis of the solution of extract for the amount of organic material extracted from the earth samples may also be effected by measuring the extent of absorption of infrared radiation by the solution of extract.

Where analysis is to be made for the quantity of only a portion of the extractable organic matter, the solutions of extract prepared as described above may be subjected to adsorption-fractionation. Adsorption-fractionation may be effected by passing the extract in solution in a suitable solvent through a column of a solid adsorbent, such as silica gel, whereby the lipids in the extract are adsorbed on the silica gel and the saturated hydrocarbons pass through the column in solution in the solvent. The amount of saturated hydrocarbons can then be determined by removing the solvent from the extract solution and weighing, or determined by absorption of infrared radiation.

It will be understood, of course, that where the earth samples are analyzed for the quantity of a selected portion of the organic matter, each of the earth samples from a prospect area will be analyzed for the quantity of the same selected portion of the organic matter. For example, where the earth samples are analyzed for the quantity of extractable organic matter, each of the earth samples from the prospect area will be analyzed for the quantity of the extractable organic matter. Similarly, where the samples are to be analyzed for the paraffin hydrocarbons contained in the extractable organic matter, each of the earth samples from the prospect area will be analyzed for the paraffin hydrocarbons.

The amounts of the selected portion or all of the organic matter in each of the earth samples having been determined, the amounts may be compared, in accordance with the common practice in the art, with the points from which each of the earth samples were taken to determine the presence of anomalies in the amounts of the selected portion or all of the organic matter at particular sampling points, which anomalies are considered to be indicative of the presence of a subterranean petroleum reservoir.

If any of the earth samples contain anomalous amounts of a selected portion or all of the organic matter, the proportion of carbon having an atomic weight of 14 to carbon having an atomic weight of 12 in at least a representative sample of the organic matter contained in the earth samples having anomalous amounts of the selected portion or all of the organic matter and in at least a representative sample of the organic matter contained in the earth samples not having anomalous amounts of the selected portion or all of the organic matter is determined.

It is only necessary to analyze for the proportion of carbon having an atomic weight of 14 to carbon having an atomic weight of 12 in the organic matter contained in representative earth samples having anomalous amounts of the selected portion or all of the organic matter, and in representative samples not having anomalous amounts of the selected portion or all of the organic matter. The organic matter in a number of earth samples having anomalous amounts of the selected portion or all of the organic matter can be combined and analysis made for the proportion of carbon having an atomic weight of 14 to carbon having an atomic weight of 12 in the combined organic matter. The same may be done with the organic matter contained in the earth samples not having anomalous amounts of the selected portion or all of the organic matter. If desired, the organic matter in each of the earth samples having anomalous amounts of the selected portion or all of the organic matter and the organic matter in each of the earth samples not having anomalous amounts of the selected portion or all of the organic matter may be analyzed for the proportion of carbon having an atomic weight of 14 to carbon having an atomic weight of 12, although this is not ordinarily necessary.

The organic matter in the earth samples or the organic matter separated from the earth samples, such as the organic matter extracted therefrom, the paraffin hydrocarbon portion of the extracted organic matter, or the carbon dioxide obtained by heating the earth sample in the presence of oxygen, may be analyzed for the proportion of carbon having an atomic weight of 14 to carbon having an atomic weight of 12. Alternatively, a portion of each earth sample not previously analyzed for a selected portion or all of the organic matter may be employed in analyzing for the proportion of carbon having an atomic weight of 14 to carbon having an atomic weight of 12. All or representative samples or a combined sample may be employed in analyzing for the proportion of carbon having an atomic weight of 14 to carbon having an atomic weight of 12, as mentioned above.

Analysis for the proportion of carbon having an atomic weight of 14 to carbon having an atomic weight of 12 may be carried out by any of the procedures heretofore employed for this purpose. Generally, these procedures involve first converting the material to be analyzed to form a compound containing the carbon atoms originally in the material, in which compound the carbon atoms represent a greater portion of the weight of the compound than in the original material, unless the carbon atoms in the original material represent as great a portion or a comparable portion of the weight of the original material as can be obtained in the compound to be formed. Thus, where the proportion of carbon having an atomic weight of 14 to carbon having an atomic weight of 12 in the organic matter contained in an earth sample or combined earth sample is to be determined, the sample may be heated in the presence of oxygen to convert the carbon in the organic matter to carbon dioxide, and the carbon dioxide thereafter converted to methane by reacting with an excess of hydrogen in the presence of ruthenium as a catalyst. Thereafter, the proportion of carbon having an atomic weight of 14 to carbon having an atomic weight of 12 in the methane is determined by measuring the extent of radioactivity of the methane. If desired, the carbon dioxide formed by heating of the earth sample in the presence of oxygen may be reacted with a metallic base to form a carbonate of the metal, such as reacting the carbon dioxide with barium hydroxide to form barium carbonate, and the proportion of carbon having an atomic weight of 14 to carbon having an atomic weight of 12 in the metal carbonate formed is determined. On the other hand, where the amount of all of the organic matter in the earth sample is determined by the previously described procedure of converting the carbon to carbon dioxide, the carbon dioxide may be converted to methane and the proportion of carbon having an atomic weight of 14 to carbon having an atomic weight of 12 in the methane may be determined, or the same procedure may be followed with respect to the metal carbonate formed. The earth sample or combined earth sample may be extracted to remove the extractable organic matter and all of the extracted organic matter or a portion thereof, such as the paraffin hydrocarbon portion, may be treated to obtain the carbon in the form of methane or a carbonate and the methane or carbonate analyzed for the proportion of carbon having an atomic weight of 14 to carbon having an atomic weight of 12. If desired, the extracted organic matter or portion thereof may be converted to carbon by well known methods and the proportion of the carbon having an atomic weight of 14 to carbon having an atomic weight of 12 determined.

The proportion of carbon having an atomic weight of 14 to carbon having an atomic weight of 12 is measured by determining the extent of radioactivity of the methane, carbon, or carbonate, or other compound, containing the carbon atoms in the organic matter of the earth sample. For this purpose, a Geiger-Müller counter, a scintillation counter, or a proportional counter may be employed. As is known, the extent of radioactivity of recently formed plant life is such as to produce about fifteen counts per minute per gram of total carbon. Accordingly, it is necessary, in order to determine the extent of radioactivity of the methane, carbon, or carbonate, or other compound, to reduce by shielding and anti-coincidence counting the background count due to cosmic radiation and other causes to a value sufficiently low that the count due to radioactivity of the methane, carbon, or carbonate, or other compound is not masked. Reduction of the background count to three or four counts per minute will be generally satisfactory. Where the number of counts per minute per unit amount of carbon in the methane, carbon, or carbonate, or other compound, obtained from unit amounts of earth sample having anomalous amounts of a selected portion or all of the organic matter contained therein is less than the number of counts per minute per unit amount of carbon in the methane, carbon, or carbonate, or other compound obtained from unit amounts of earth sample not having anomalous amounts of a selected portion or all of the organic matter contained therein, the earth samples containing anomalous amounts of a selected portion or all of the organic matter contained therein will contain organic matter derived from a subterranean petroleum reservoir and the presence of the subterranean petroleum reservoir is indicated.

Having thus described my invention, it will be understood that such description has been given by way of illustration and example and not by way of limitation, reference for the latter purpose being had to the appended claims.

I claim:

1. A geochemical prospecting method for a subterranean petroleum reservoir comprising collecting earth samples from a prospect area, analyzing each of said earth samples for the quantity therein of at least a selected portion of the organic matter, and analyzing at least a representative sample of the organic matter contained in the earth samples having anomalous amounts of at least said selected portion of said organic matter and at least a representative sample of the organic matter contained in the earth samples not having anomalous amounts of at least said selected portion of said organic matter for the proportion of carbon therein having an atomic weight of 14 to carbon having an atomic weight of 12.

2. A geochemical prospecting method for a subterranean petroleum reservoir comprising collecting earth samples from a prospect area, analyzing each of said earth samples for the quantity therein of at least a selected portion of the organic matter, and analyzing at least a representative sample of the organic matter contained in the earth samples having anomalous amounts of at least said selected portion of said organic matter and at least a representative sample of the organic matter contained in the earth samples not having anomalous amounts of at least said selected portion of said organic matter for the amount of carbon therein having an atomic weight of 14.

3. A geochemical prospecting method for a subterranean petroleum reservoir comprising collecting earth samples from a prospect area, analyzing each of said earth samples for the quantity therein of extractable organic matter, and analyzing at least a representative sample of the organic matter contained in the earth samples having anomalous amounts of said extractable organic matter and at least a representative sample of the organic matter contained in the earth samples not having anomalous amounts of said extractable organic matter for the proportion of carbon therein having an atomic weight of 14 to carbon having an atomic weight of 12.

4. A geochemical prospecting method for a subterranean petroleum reservoir comprising collecting earth samples from a prospect area, analyzing each of said earth samples for the quantity therein of paraffin hydrocarbons, and analyzing at least a representative sample of the organic matter contained in the earth samples having anomalous amounts of said paraffin hydrocarbons and at least a representative sample of the organic matter contained in the earth samples not having anomalous amounts of said paraffin hydrocarbons for the proportion of carbon therein having an atomic weight of 14 to carbon having an atomic weight of 12.

5. A geochemical prospecting method for a subterranean petroleum reservoir comprising collecting earth samples from a prospect area, extracting each of said earth samples with a solvent capable of desorbing and dissolving any extractable organic matter contained in said earth samples to obtain an extract from each of said earth samples, determining the weight of each of said extracts, and analyzing at least a representative sample of the organic matter contained in the earth samples having anomalous weights of said extract and at least a representative sample of the organic matter contained in the earth samples not having anomalous weights of said extract for the proportion of carbon therein having an atomic weight of 14 to carbon having an atomic weight of 12.

6. A geochemical prospecting method for a subterranean petroleum reservoir comprising collecting earth samples from a prospect area, extracting each of said earth samples with a solvent capable of desorbing and dissolving any extractable organic matter contained in said earth samples to obtain an extract from each of said earth samples, removing said solvent from each of the resulting solutions of extract, determining the weight of each of said extracts, and analyzing at least a representative sample of the organic matter contained in the earth samples having anomalous weights of said extract and at least a representative sample of the organic matter contained in the earth samples not having anomalous weights of said extract for the proportion of carbon therein having an atomic weight of 14 to carbon having an atomic weight of 12.

7. A geochemical prospecting method for a subterranean petroleum reservoir comprising collecting earth samples from a prospect area, extracting each of said earth samples with a solvent capable of desorbing and dissolving any extractable organic matter contained in said earth samples to obtain an extract from each of said earth samples, determining the weight of each of said extracts, and analyzing at least a representative sample of the extracts contained in the earth samples having anomalous weights of said extract and at least a representative sample of the extracts contained in the earth samples not having anomalous weights of said extract for the proportion of carbon therein having an atomic weight of 14 to carbon having an atomic weight of 12.

8. A geochemical prospecting method for a subterranean petroleum reservoir comprising collecting earth samples from a prospect area, analyzing each of said earth samples for the quantity therein of at least a selected portion of the organic matter, and analyzing at least a representative sample of the selected portion of the organic matter contained in the earth samples having anomalous amounts of at least said selected portion of said organic matter and at least a representative sample of the selected portions of said organic matter contained in the earth samples not having anomalous amounts of at least said selected portion of said organic matter for the proportion of carbon therein having an atomic weight of 14 to carbon having an atomic weight of 12.

9. A geochemical prospecting method for a subterranean petroleum reservoir comprising collecting earth samples from a prospect area, analyzing each of said earth samples for the quantity therein of at least a selected portion of the organic matter, and analyzing each of said earth samples having anomalous amounts of at least said selected portion of said organic matter and each of said earth samples not having anomalous amounts of at least said selected portion of said organic matter for the proportion of carbon therein having an atomic weight of 14 to carbon having an atomic weight of 12.

10. A geochemical prospecting method for a subterranean petroleum reservoir comprising collecting earth samples from a prospect area, analyzing each of said earth samples for the quantity therein of extractable organic matter, and analyzing each of said earth samples having anomalous amounts of said organic matter and each of said earth samples not having anomalous amounts of said organic matter for the proportion of carbon therein having an atomic weight of 14 to carbon having an atomic weight of 12.

11. A geochemical prospecting method for a subterranean petroleum reservoir comprising collecting earth samples from a prospect area, analyzing each of said earth samples for the quantity therein of paraffin hydrocarbons and analyzing said earth samples having anomalous amounts of said paraffin hydrocarbons and said earth samples not having anomalous amounts of said paraffin hydrocarbons for the proportion of carbon therein having an atomic weight of 14 to carbon having an atomic weight of 12.

12. A geochemical prospecting method for a subterranean petroleum reservoir comprising collecting earth samples from a prospect area, analyzing each of said earth samples for the quantity therein of at least a selected portion of the organic matter, and analyzing at least a representative sample of the organic matter contained in the earth samples having anomalous amounts of at least said selected portion of said organic matter and at least a representative sample of the organic matter contained in the earth samples not having anomalous amounts of at least said selected portion of said organic matter for the amount of radioactive carbon atoms contained in said organic matter.

13. A geochemical prospecting method for a subterranean petroleum reservoir comprising collecting earth samples from a prospect area, analyzing each of said earth samples for the quantity therein of at least a selected portion of the organic matter, and analyzing at least a representative sample of the organic matter contained in the earth samples having anomalous amounts of at least said selected portion of said organic matter and at least a representative sample of the organic matter contained in the earth samples not having anomalous amounts of at least said selected portion of said organic matter for the extent of radioactivity of the carbon atoms contained in said organic matter.

14. A geochemical prospecting method for a subterranean petroleum reservoir comprising collecting earth samples from a prospect area, analyzing each of said earth samples for the quantity therein of at least a selected portion of the organic matter, and measuring the extent of radioactivity of the carbon atoms contained in the organic matter contained in the earth samples having anomalous amounts of at least said selected portion of said organic matter and contained in the organic matter contained in the earth samples not having anomalous amounts of at least said selected portion of said organic matter.

15. A geochemical prospecting method for a subterranean petroleum reservoir comprising collecting earth samples from a prospect area, analyzing each of said earth samples for the quantity therein of extractable organic matter, and analyzing at least a representative sample of the organic matter contained in the earth samples having anomalous amounts of said extractable organic matter and at least a representative sample of the organic matter contained in the earth samples not having anomalous amounts of said extractable organic matter for the extent of radioactivity of the carbon atoms contained in said organic matter.

16. A geochemical prospecting method for a subterranean petroleum reservoir comprising collecting earth samples from a prospect area, analyzing each of said earth samples for the quantity therein of paraffin hydrocarbons, and analyzing at least a representative sample of the organic matter contained in the earth samples having anomalous amounts of said paraffin hydrocarbons and at least a representative sample of the organic matter contained in the earth samples not having anomalous amounts of said paraffin hydrocarbons for the extent of radioactivity of the carbon atoms contained in said organic matter.

17. A geochemical prospecting method for a subterranean petroleum reservoir comprising collecting earth samples from a prospect area, extracting each of said earth samples with a solvent capable of desorbing and dissolving any extractable organic matter contained in said earth samples to obtain an extract from each of said earth samples, determining the weight of each of said extracts, and analyzing at least a representative sample of the organic matter contained in the earth samples having anomalous weights of said extract and at least a representative sample of the organic matter contained in the earth samples not having anomalous weights of said extract for the extent of radioactivity of the carbon atoms contained in said organic matter.

References Cited in the file of this patent

FOREIGN PATENTS 112,637  Australia _____ Mar. 13, 1941

OTHER REFERENCES

Bartlett: Science 114, July 20, 1951, pages 55–56.
Smith: Science 116, October 27, 1952, pages 437–439.
West: Geophysics, vol. 10, 1945, pages 406, 420.
Craig: Georchimica et Cosmochimica Acta, vol. 3, No. 2/3, February 1953 (article received May 25, 1952), pages 53, 77, 78, 79, 80.